Oct. 18, 1927.
H. HILL
1,646,355
BALING PRESS
Filed Sept. 24, 1923    4 Sheets-Sheet 1
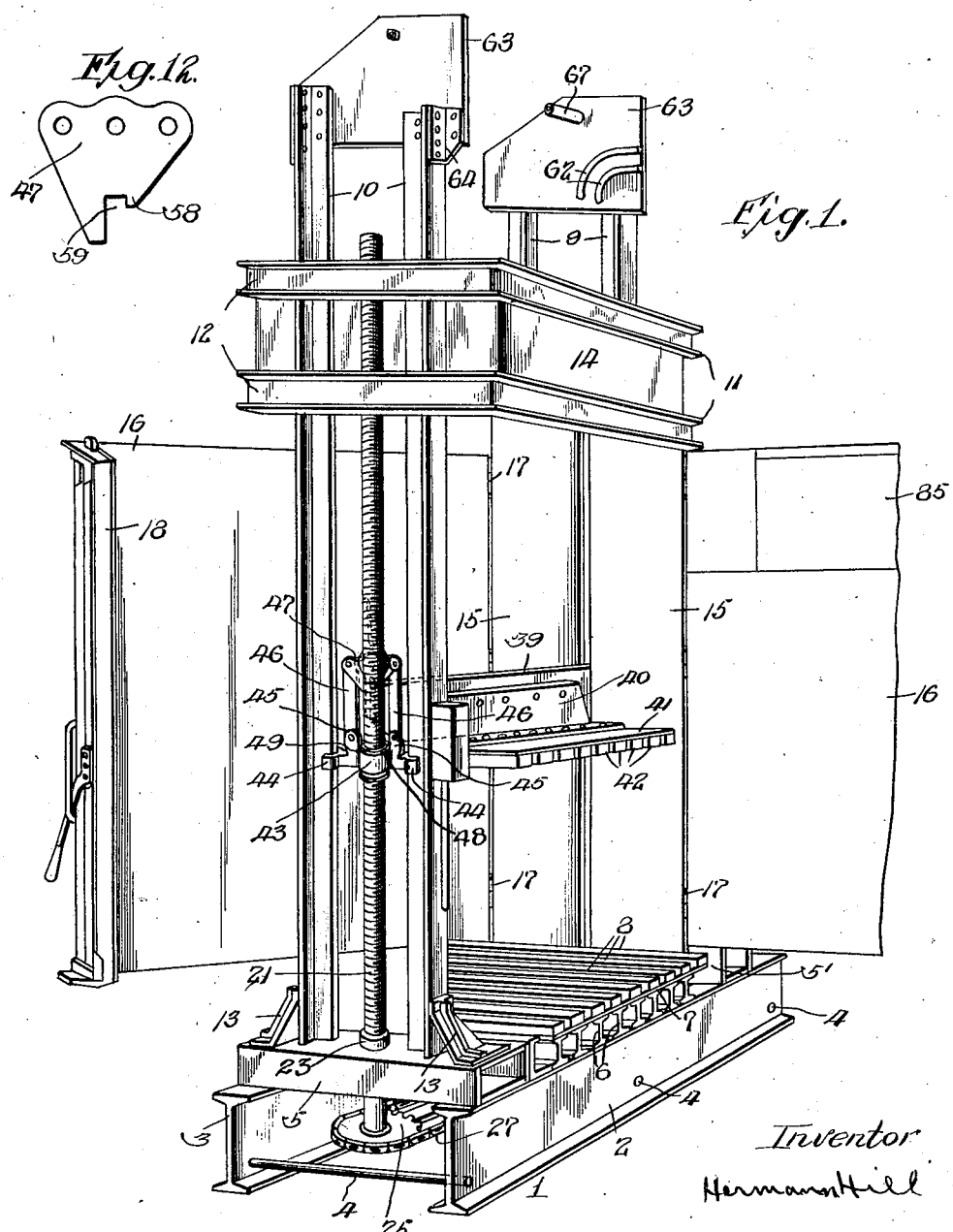
Inventor
Hermann Hill
By Percy H. Moore
Atty.

Oct. 18, 1927.
H. HILL
BALING PRESS
Filed Sept. 24, 1923
1,646,355
4 Sheets-Sheet 2
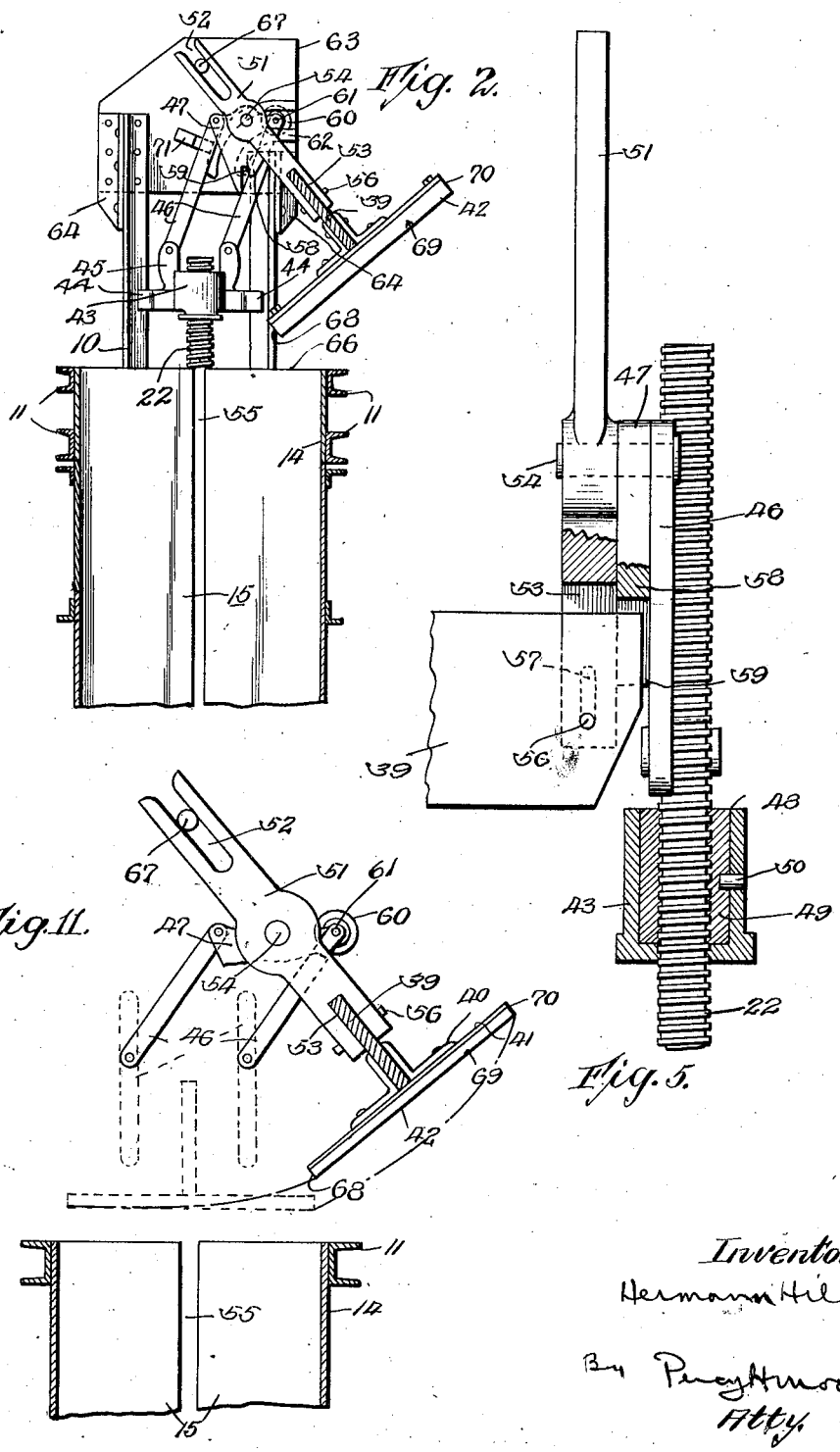
Inventor
Hermann Hill
By Percy Hinson
Atty.

Oct. 18, 1927.
H. HILL
1,646,355
BALING PRESS
Filed Sept. 24, 1923    4 Sheets-Sheet 3
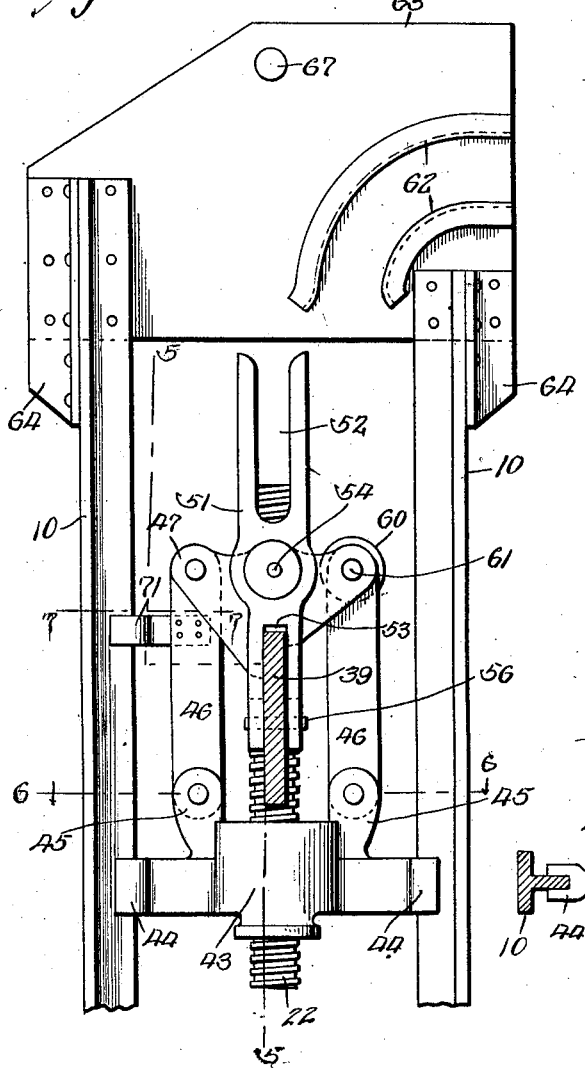
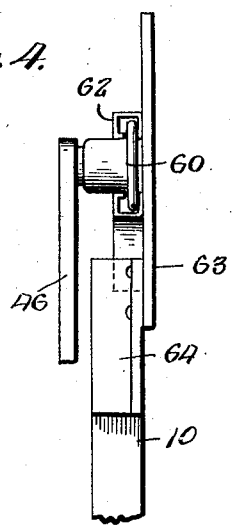
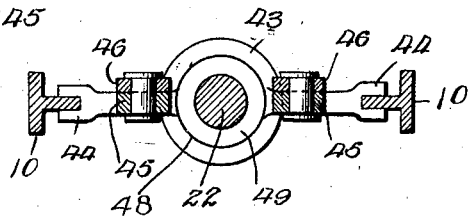
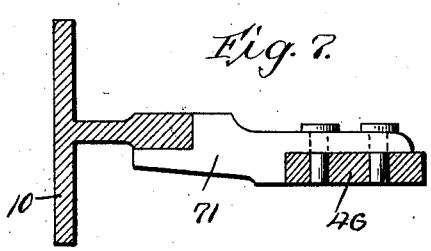
Inventor
Hermann Hill
By Percy H. Moore
Atty.

Oct. 18, 1927. 1,646,355
H. HILL
BALING PRESS
Filed Sept. 24, 1923  4 Sheets-Sheet 4
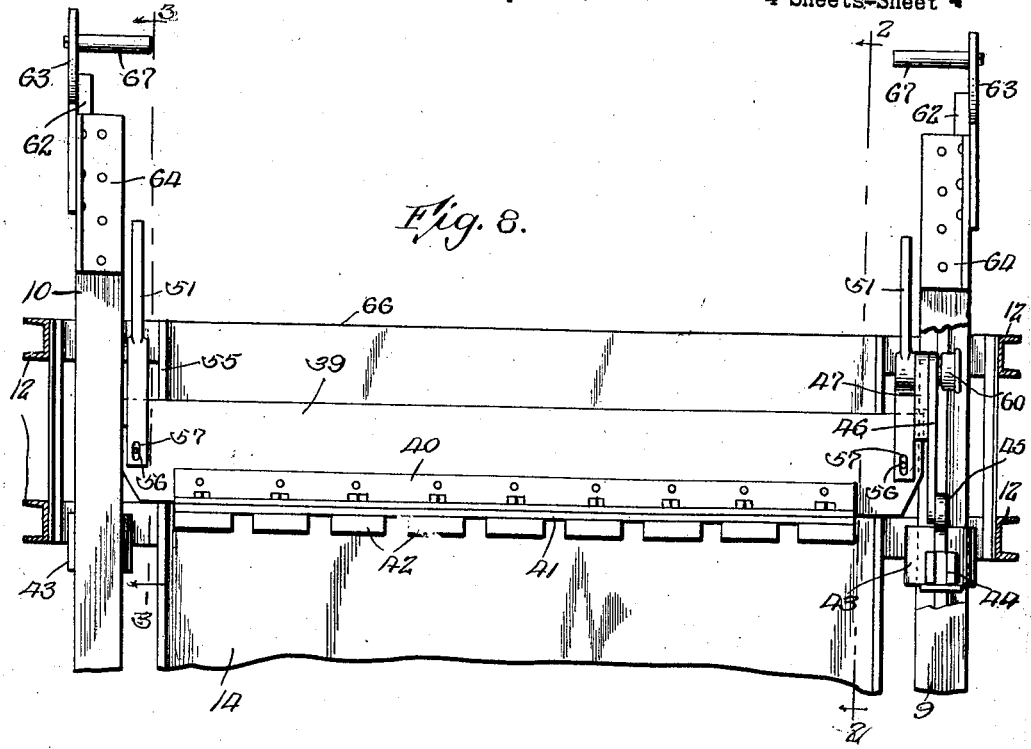
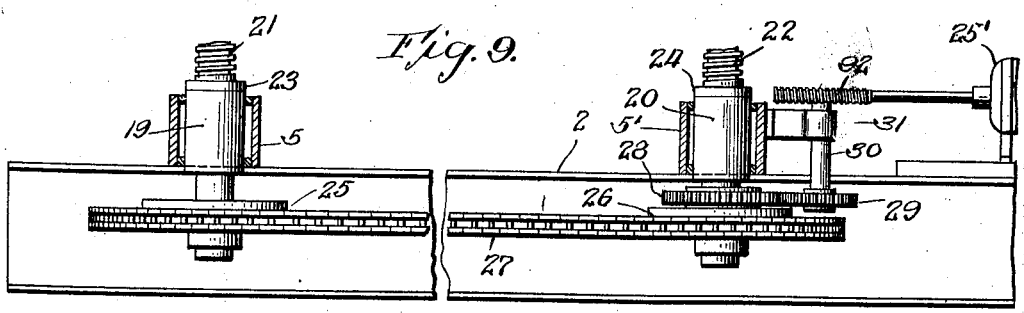
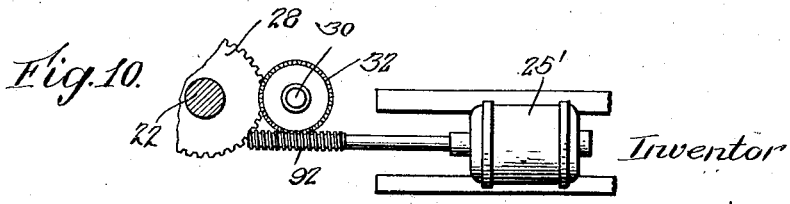
Inventor
Herman Hill
By Percy H. Moore
Atty.

Patented Oct. 18, 1927.

1,646,355

UNITED STATES PATENT OFFICE.

HERMANN HILL, OF FREDONIA, NEW YORK, ASSIGNOR, BY MESNE ASSIGNMENTS, TO ECONOMY BALER COMPANY, OF ANN ARBOR, MICHIGAN, A CORPORATION OF MICHIGAN.

BALING PRESS.

Application filed September 24, 1923. Serial No. 664,333.

This invention relates to baling presses or more particularly to power driven presses.

The principal object of the invention is to provide means for swinging the baling plunger clear of the top of the baling chamber, thus permitting loading or charging of the baling chamber from the top thereof.

Other and further objects and advantages of the invention will be obvious as the specification is read in connection with the drawings.

In the accompanying drawings forming part of this specification:

Figure 1 is a side elevation of the baling press;

Figure 2 is a section on the line 2—2 of Figure 8;

Figure 3 is a section on the line 3—3 of Figure 8;

Figure 4 is a detail side elevation showing one of the guide rollers engaging in one of the channels or tracks;

Figure 5 is a section on the line 5—5 of Figure 3;

Figure 6 is a section on the line 6—6 of Figure 3;

Figure 7 is a section on the line 7—7 of Figure 3;

Figure 8 is a detail side elevation partly in section of the upper portion of the press;

Figure 9 is a detail side elevation showing the means for operating the vertical screws;

Figure 10 is a detail fragmentary plan of some of the parts shown in Figure 9;

Figure 11 is a similar view to Figure 2 showing the plunger member at the limit of its outward swinging movement and Figure 12 is a side view of one of the pressure yokes detached.

Referring more particularly to the drawings wherein like reference numerals denote corresponding parts throughout the several views, 1, represents a base comprising a pair of parallel longitudinally disposed spaced I beams 2 and 3, connected together by a plurality of transverse rods 4. The beams 2 and 3 are also braced by a pair of metallic boxings or platforms 5 and 5' located at opposite ends of and spanning the said beams 2 and 3. A plurality of short transverse I beams 6, span the space between the platforms 5 and 5' and rest upon the beams 2 and 3, intermediate the ends thereof. These transverse beams support a sheet metal plate 7, which in turn supports the transversely arranged wooden slats 8, the parts just described, that is, transverse beams 6, plate 7, and slats 8, constituting the platen of the baling chamber to be referred to hereinafter.

The platform 5' positioned at what may be termed the motor end of the base 1, supports a pair of spaced T shaped vertical beams 9, while the platform 5 at the opposite end of the base also supports a pair of similarly shaped and spaced beams 10. These beams 9 and 10 are suitably braced at intervals by side beams 11, and end beams 12, and at their lower ends are braced by angle brackets or braces 13.

The baling chamber comprises an upper fixed rectangular hopper portion 14, enclosed within and supported by certain of the side and end bars 11 and 12 previously referred to. One end wall of the baling chamber is composed of a pair of spaced vertically disposed boards or plates 15, extending from the base 1, upwardly into the hopper portion 14. A pair of doors 16, hinged to the outer edges of the end plate 15, as at 17, carry at their free edges angularly disposed plates 18, (only one of which is shown) which constitute the other end wall of the baling chamber when the doors 16, are swung to closed position.

The platforms 5 and 5' are formed with bearings 19 and 20 in which vertical screws 21 and 22 are rotatably mounted, screw-threaded collars 23 and 24 serving to support the respective screws in their bearings. Connected to the lower extremities of the respective screws are sprocket wheels or gears 25 and 26 which are driven by a sprocket chain 27. The screw 22, also carries a gear 28, directly above the sprocket wheel 26, which meshes with a gear 29, on the lower end of a vertical shaft 30. This vertical shaft 30, which is rotatably mounted in an arm 31, projecting from the platform 5' is formed with a worm gear 32, driven from the motor 25, by means of a worm 92, connected to the motor 25, by any suitable flexible coupling.

The piston or plunger member of the press comprises what may be termed a plunger bar 39, of heavy steel, and preferably rectangular in cross section. Rigidly secured to the sides of this bar 39, are a pair of rectangular shaped brackets 40, to the bottoms of which is riveted a steel plate 41, of substantially the same size and shape as the steel plate 7, previously referred to, and secured to the bottom of this plate 41, are a plurality of slats 42, similar to the slats 8, also previously referred to.

Mounted for vertical movement on the respective vertical screws 21 and 22 are nuts 43, preferably hollowed out as at 48, to receive an internally threaded insert member 49, of bronze keyed to the nuts proper by keys 50, but it is obvious that the threaded inserts may be dispensed with and the threads formed on the nuts proper. The purpose of the insert member is to permit of convenient replacement should the threads become worn. Each nut 43, is formed with bifurcated oppositely extending portions 44, adapted to engage the respective T shaped vertical beams 9 and 10, thus preventing rotation of the nuts but allowing the latter to move up and down upon the screws when the screws are turned. Each nut 43, has two oppositely disposed upstanding ears 45, to which the lower ends of parallel links 46, are pivotally connected. The upper ends of these links are pivotally connected to opposite sides of pressure yokes 47, it being understood that there is a yoke 47, at each end of the machine, that is one for each nut and set of parallel links. These pressure yokes exert pressure upon the ends of the plunger bar during the downward stroke and also serve as a back stop to limit the inward swing of the plunger bar when the latter is being swung to operative position as will be hereinafter explained.

A pair of rocker arms 51, having their upper and lower ends notched or forked as at 52 and 53 respectively are pivotally supported intermediately their ends to the top portions of the respective pressure yokes 47, between the pivot connections of the upper ends of the links 46, by means of pivot pins 54. The plunger bar 39, passes at one end through the opening or slot 55, between the end wall boards or plates 15, and at the opposite end through the opening or slot (not shown) formed between the adjacent edges of the angularly disposed plates 18, when the doors 16, are closed. The opposite ends of the plunger bar seat in the notches 53, formed in the lower ends of the rocker arms 51, and are retained and supported therein by pins 56, carried by the plunger bar and extending through vertical elongated slots or openings 57, in the lower notched ends of the rocker arms.

It will be understood that simultaneous rotation of the screws 21 and 22, in the appropriate direction by means of the motor 25, and gearing previously described, will cause the nuts 43, and consequently the plunger bar and attached parts to ride upwardly on the screws.

During this upward movement the pressure of the pressure yoke upon the ends of the plunger bar is released and the bar is permitted to drop down by gravity until the upper edge of the bar is clear of the short or forward wall 58, of the notch 59, formed in the pressure yoke 47. In other words the plunger bar remains stationary during the initial upward movement until the pins 56, carried by the rocker arms engage the upper walls of the elongated slots or openings 57, in the ends of the plunger bar at which time the short walls 58 just referred to will be clear of the top edge of the plunger bar. This is necessary because during the outward swinging movement of the plunger member to inoperative position the latter swings outwardly at greater velocity than the pressure yoke, as will presently be described.

As the ends of the plunger bar emerge from the slot 55, and the slot (not shown) formed between the adjacent edges of the aforementioned plates 18, and the plunger member is clear of the top edge of the hopper portion 14, the rollers 60, mounted on the pivot pins 61, of these links 46, located toward what may be termed the plunger-out-movement side of the press enter the upwardly and outwardly curved guide channels or tracks 62, secured to end plates 63, in turn attached by brackets 64, to the upwardly projecting ends of the vertical beams 9 and 10. The pressure yoke and parts carried thereby are thus deflected outwardly from the vertical path. The fulcrum pins or studs 54, which secure the rocker arms to the yoke travel the same curved path as the rollers 60, but the path of the studs is nearer the center of the press by the distance between themselves and the axial center of the respective rollers. The reason for this arrangement lies in the necessity of locating the pressure yokes in close proximity to the screws 21 and 22 and thereby also bringing the ends of the plunger bar to a point just out of contact with the screws so as to avoid or reduce side pressure to a minimum. Hence the rollers 60, are located remote from the screws.

During the outward swinging movement of the plunger board across the top of the press chamber 66, it will be noted that the upper forked or notched ends 52, of the rocker arms engage respectively the oppositely disposed pins 67, carried by the plates 63. At the time the fulcrums 54, of the rocker arms are deflected outwardly from the normal vertical travel by the rollers 60, engaging the channels 62, the upper end of the rocker arms will have reached a stationary point in their upward travel and consequently the plunger movement will be accentuated. This combined action of the pressure yoke guide roller and rocker arm gives the inner edge 68, of the piston 69, an outward movement across the top of the press chamber in a substantially straight line while the outer edge 70, of the piston is swung upwardly. Consequently on the return movement the piston does not dip into the material with which the press has been filled while the plunger member was in inoperative position.

When the screws 21 and 22 are simultaneously rotated in a direction opposite to that required to swing the plunger member to inoperative position, the plunger member will be swung inwardly, the inner edge of the piston travelling in a substantially straight line a few inches above the top of the press chamber until a central position has been reached, with the guides 71, on the inner links 46, in engagement with the respective vertical beams 9 and 10, and the inner face of the plunger board engaging the long inner wall of slot 59, which in effect forms a back stop, whereupon the plunger member moves downwardly until the piston reaches the filling material. The plunger member is then halted and the pressure yokes descend until the upper end edges of the plunger board 39, engage in the notches 59, in the pressure yokes 47, and pressure is exerted against the plunger board by the yoke.

The cycle of operation just described is carried out indefinitely by any suitable switch or motor reversing mechanism (not shown). Access may be had to the press chamber through a small trap door 85, formed in one of the doors 16.

Having thus described my invention, what I claim is:

1. In a baling press, the combination with a chamber having an open end, of a plunger member movable transversely of said chamber beyond said open end and also movable within said chamber, a screw, a nut threaded upon said screw, a pair of links pivotally connected to said nut at one end, a pressure yoke pivotally connected to the other ends of said links, a rocker arm pivoted to said yoke, and means for connecting said plunger member to said rocker arm.

2. In a baling press, the combination with a vertical baling chamber having an open upper end, of vertical screws at opposite ends of said baling chamber, a plunger member including a piston adapted to be raised and lowered within said chamber by the inner edge of said screws, and a guide for compelling said plunger member to move laterally outwardly and upwardly, and the inner edge of the piston to travel in substantially a straight horizontal line over and beyond the upper end of said chamber, the corresponding movement of the outer end of the plunger member being on a gradually increasing upward curve.

3. In a baling press, the combination with a chamber having an open upper end, of a plunger member including a piston adapted to be raised and lowered within said chamber and means for compelling said plunger member to swing outwardly, and the inner edge of the piston to travel over and beyond the upper end of said chamber, the initial outward movement of the inner edge of the plunger member being in a substantially straight line and the balance of said outward movement on a gradually increasing upward curve, the corresponding movement of the outer end of the plunger member being on a gradually increasing upward curve.

4. In a baling press, the combination with a chamber having an open upper end, of a plunger member including a piston, means for raising said plunger member until the piston has cleared the said open end, and means causing the plunger member to swing outwardly at the completion of said raising movement, and causing the inner edge of the piston to travel over and beyond the upper end of said chamber, the initial outward movement of the inner edge of the plunger member being in a substantially straight line and the balance of said outward movement on a gradually increasing upward curve, the corresponding movement of the outer end of the plunger member being on a gradually increasing upward curve.

5. In a baling press, the combination with a chamber having an open upper end, of a screw, and a plunger member including a piston connected to said screw and movable within said chamber, and means for automatically causing said plunger member to swing outwardly, and to cause the inner edge of the piston to travel over and beyond the upper edge of said chamber, the initial outward movement of the inner edge of the plunger member being in a substantially straight line and the balance of said outward movement on a gradually increasing upward curve, the corresponding movement of the outer end of the plunger member being on a gradually increasing upward curve.

6. In a baling press, the combination with a chamber having an open end, of a plunger member including a piston movable transversely of said chamber beyond said open end and also movable within said chamber, a screw connected to said plunger member for actuating the same, and means for compelling said plunger member to swing transversely of said chamber beyond said open end to open position upon rotation of said screw in one direction and to return into registration with said open end upon rotation of said screw in the opposite direction, said means causing the inner edge of said piston to travel in a substantially straight horizontal line to and fro across and above the said open end during said swinging movements of said plunger, the corresponding movement of the outer end of the plunger member being on a gradually increasing upward curve.

7. A baling press comprising a baling chamber open at its upper end, plunger actuating screws, a plunger movable transversely of said chamber beyond said open end and also movable within said chamber, nuts mounted on said screws but fixed against rotation, pressure yokes adapted to bear on said plunger member during the working stroke thereof, means pivotally connecting said yokes to said nuts, and rocker arms pivotally connected to said pressure yokes and supporting said plunger member.

8. A baling press comprising a baling chamber open at its upper end, plunger actuating screws, a plunger member including a plunger board movable transversely of said chamber beyond said open end and also movable within said chamber, nuts mounted on said screws but fixed against rotation, pressure yokes adapted to bear on said plunger member during the working stroke thereof, means pivotally connecting said yokes to said nuts, and rocker arms pivotally connected to said pressure yokes and supporting said plunger member, said yokes having notches to receive the upper edge of said plunger.

9. A baling press comprising a baling chamber open at its upper end, plunger actuating screws, a plunger movable transversely of said chamber beyond said open end and also movable within said chamber, nuts mounted on said screws but fixed against rotation, pressure yokes adapted to bear on said plunger member during the working stroke thereof, means pivotally connecting said yokes to said nuts, and rocker arms pivotally connected to said pressure yokes and supporting said plunger member, said yokes being formed with stops to limit the inward movement of said plunger member.

In testimony whereof I affix my signature.

HERMANN HILL.